May 8, 1934. W. B. RUNK 1,958,248
BOTTLE CORK FEEDING MACHINE
Filed May 28, 1932 3 Sheets-Sheet 1
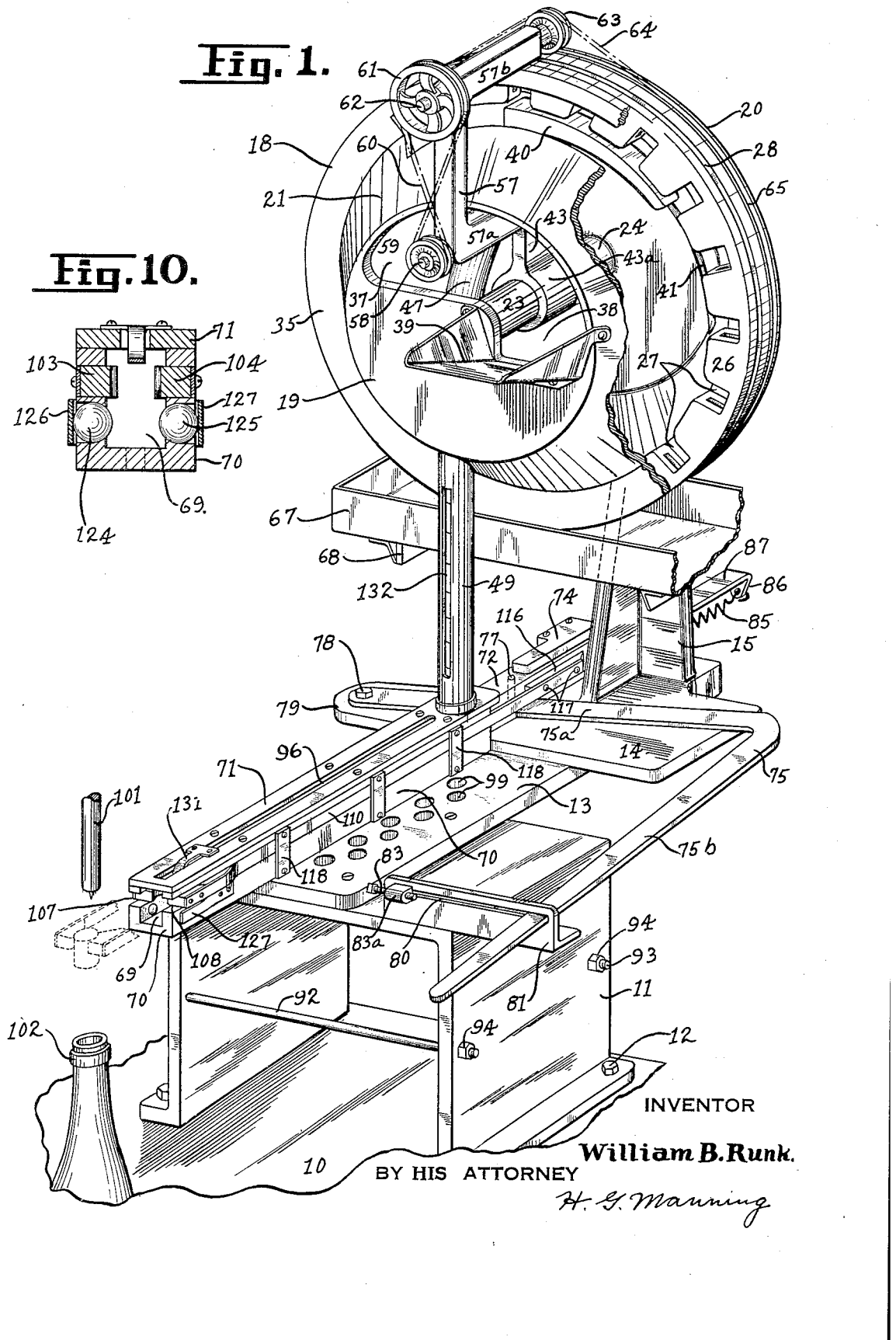
INVENTOR
William B. Runk.
BY HIS ATTORNEY
*H. G. Manning*

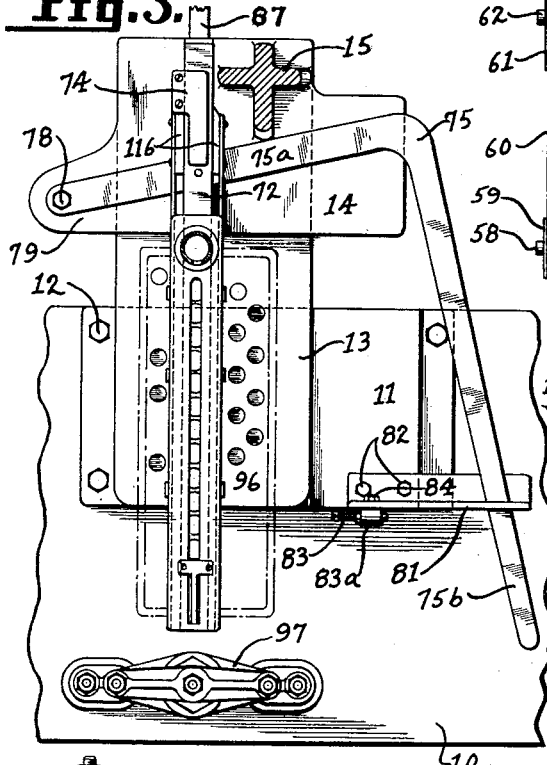
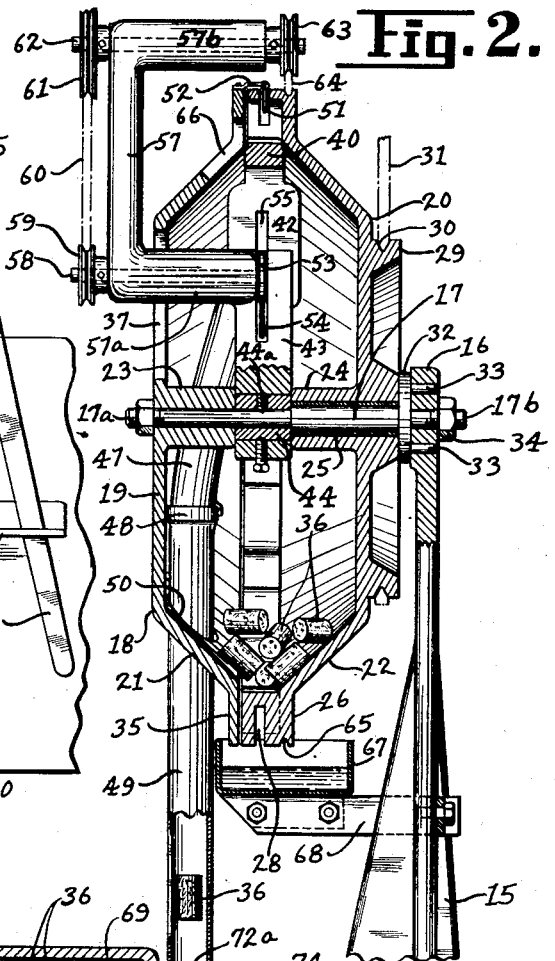
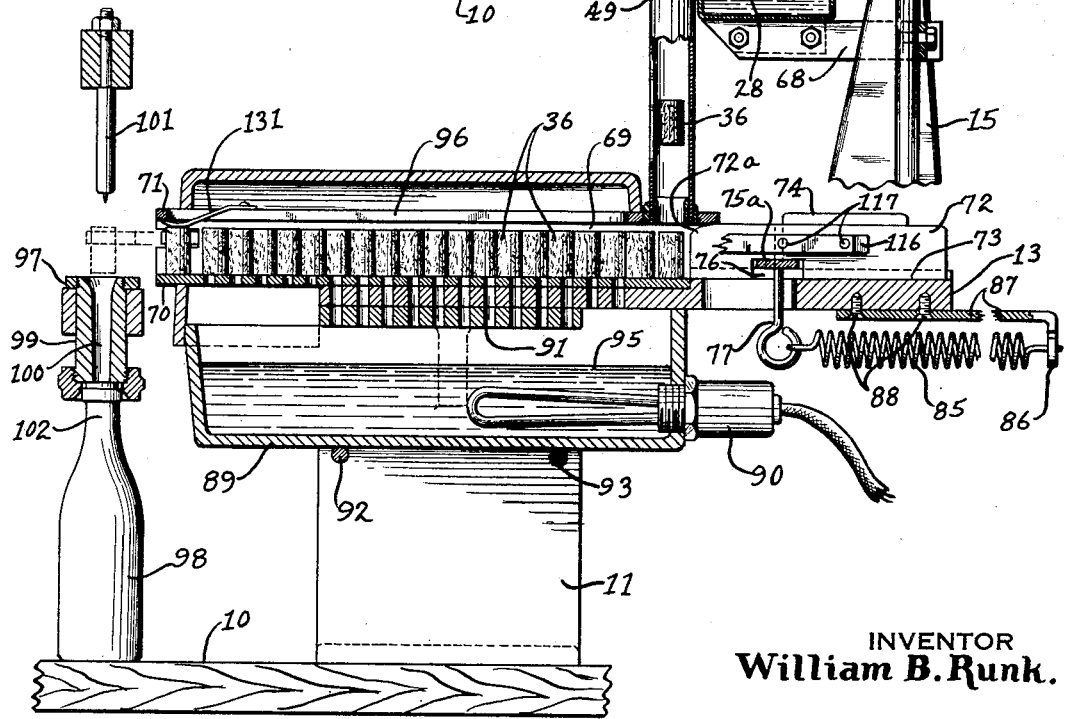

May 8, 1934.　　　　W. B. RUNK　　　　1,958,248
BOTTLE CORK FEEDING MACHINE
Filed May 28, 1932　　　3 Sheets-Sheet 3
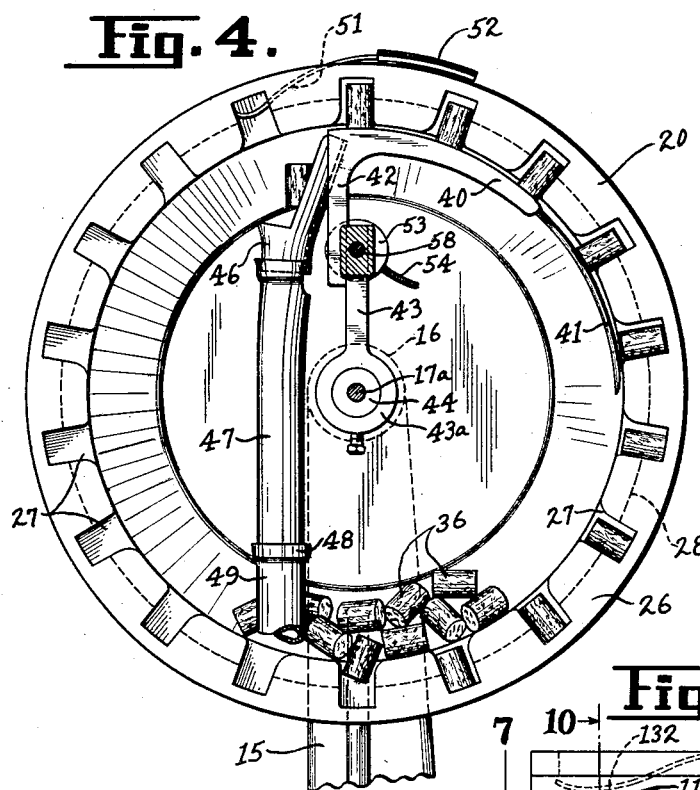
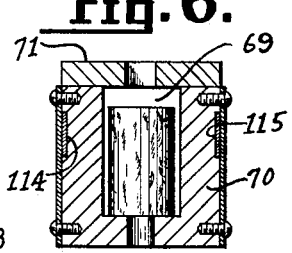
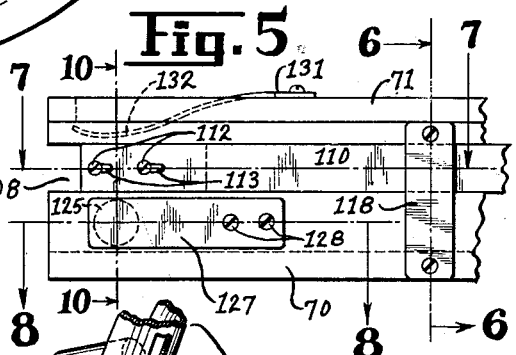
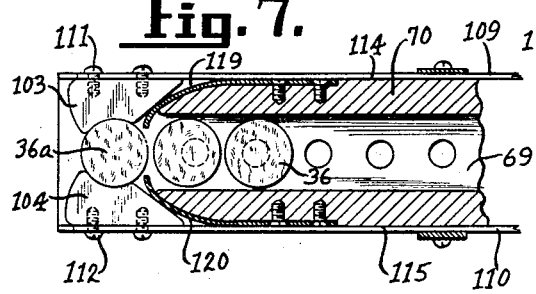
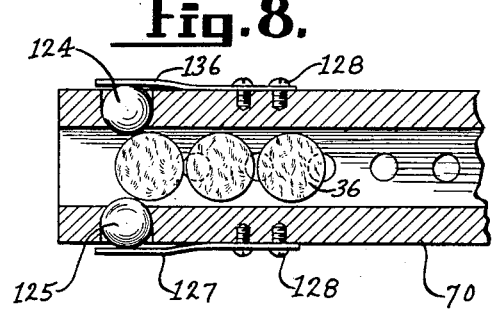
INVENTOR
William B. Runk.
BY HIS ATTORNEY
H. G. Manning Patented May 8, 1934

1,958,248

UNITED STATES PATENT OFFICE 1,958,248

BOTTLE CORK FEEDING MACHINE

William B. Runk, Waterbury, Conn., assignor to The Draher Machine Company, Waterbury, Conn., a corporation of Connecticut Application May 28, 1932, Serial No. 614,258

9 Claims. (Cl. 226—92)

This invention relates to cork-feeding machines, and more particularly to a hopper type of machine for handling untapered cylindrical corks.

One object of this invention is to provide an automatic cork-feeding machine which may be used in connection with a machine for filling bottles with a liquid, such as a beverage, without being touched by human hands.

A further object is to provide a machine of the above nature having means for treating the corks with a softening agent, and intermittently delivering them to a position above the bottle filling machine in proper position for insertion in the necks of the bottles.

A further object is to provide a machine of the above nature having a hopper rotating on a horizontal axis, from which the corks are automatically picked up and dropped down a tubular chute, from which they are pushed in vertical position through a horizontal channel in a steam chamber for softening prior to being inserted in the bottle necks.

A further object is to provide a machine of the above nature which will be comparatively simple in construction, inexpensive to manufacture, easy to install and manipulate, compact, ornamental in appearance, and very efficient and durable in use.

With these and other objects in view there has been illustrated on the accompanying drawings one form in which the invention may be conveniently embodied in practice.

In the drawings:

Fig. 1 represents a perspective view of the cork-feeding machine as it appears with the steam jacket removed, and other parts broken away to show the interior construction.

Fig. 2 is a longitudinal sectional view taken through the essential working parts of the machine.

Fig. 3 is a plan view of the cork transfer mechanism, the outline of the steam jacket being shown in dot and dash lines.

Fig. 4 is a front elevation view of the rotating section of the hopper mechanism.

Fig. 5 is an enlarged side elevation view of the front end of the transfer mechanism.

Fig. 6 is a transverse sectional view of the same, taken along the line 6—6 of Fig. 5.

Fig. 7 is an upper horizontal sectional view of the same, taken along the line 7—7 of Fig. 5.

Fig. 8 is a lower horizontal sectional view of the same taken along the line 8—8 of Fig. 5.

Fig. 9 is a detail perspective view of the cork chute and "knock out" wheel for preventing clogging of said chute.

Fig. 10 is a transverse sectional view of the guide rail, taken along the line 10—10 of Fig. 5.

The mechanical handling of corks for delivery to bottling machines has been found in the past to be quite a difficult task, because they are very light, easily injured, and are liable to become jammed in the delivery chute or other mechanism employed. By means of the present invention the above and other disadvantages have been eliminated.

Referring now to the drawings in which like reference numerals denote corresponding parts throughout the several views, the numeral 10 indicates a table or standard upon which the cork-feeding machine is supported, said table preferably forming part of a bottle filling machine not shown, and forming no part of the present invention. The cork-feeding machine rests upon a substantially heavy, inverted, U-shaped base bracket 11 held on the table 10 by means of bolts 12. A heavy bed plate 13 is secured to the top face of the U-shaped base bracket 11, and extends rearwardly therefrom. Integrally secured to the rear upper part of the plate 13 is a raised platform 14 extending laterally to the right therefrom, as clearly viewed in Fig. 1. The plate 13 is provided with an upstanding cross-shaped post 15 terminating at its upper end in a head 16 for supporting the rear end of a forwardly extending hopper-carrying spindle 17.

Hopper mechanism

The hopper 18 consists of a pair of parallel spaced dished drums 19 and 20 having conical flanged portions 21 and 22 respectively. The front drum 19 is a stationary drum and is provided with an integral inwardly formed concentric hub 23 by which means said drum 19 is rigidly secured upon the forward reduced section 17a of the spindle 17.

The rear drum 20 is a rotating drum, and is provided with an inner hub 24 having an interior bearing bushing 25 journalled upon the spindle 17. The rear drum 20 is provided with a substantially heavy outer rim 26 within which are formed a plurality of equally spaced radial sockets 27 open on the inside.

The outer periphery of the rim 26 is provided with a deep annular groove 28 adapted to intersect said radial sockets 27 for a purpose to be explained later.

The rear of the drum 20 has a raised annular rim 29 provided with a V-shaped outer groove 30 to receive a V-shaped driving belt 31 for rotating the hopper. The belt 31 is adapted to receive power from any suitable source, such as a line shaft, or an electric motor, not shown.

The spindle 17 is provided with an integral flange 32 interposed between the drum hub 24 and the head 16, said flange having attached thereto a pair of dowel pins 33 fitted within alined holes in said head 16. The spindle 17 is locked to the head 16 by means of a nut 34, adapted to be screwed upon the threaded extremity 17b of said spindle 17.

The front stationary drum 19 is provided with an outer rim 35 slightly spaced from the rim 26 so as to avoid friction therebetween.

For permitting access to the interior of the hopper 18 whenever it is necessary to fill it with corks 36, the upper wall of the stationary drum is provided with an arcuate opening 37 having a downwardly offset section 38, the lower edge of which alines with an inclined trough 39 for guiding the corks 36 into the hopper 18.

During the rotation of the drum 20 the corks 36 will be continuously agitated, and will be separately picked up by the radial sockets 27. As the hopper 18 rotates in a counter-clockwise direction as viewed in Fig. 4, the corks will be carried upwardly and when they reach a position above the horizontal will be prevented from falling out of the sockets 27 by the arcuate cork retaining track 40, and an arcuate wire rod 41 extending downwardly from said track 40.

The arcuate cork retaining track 40 has a depending arm 42 which is attached to an upright supporting bracket 43 having an integral enlarged hollow boss 43a and an internal bushing 44 which in turn is locked upon the reduced section 17a of the shaft 17 as by a set screw 44a. The bushing 44 is interposed between the inner ends of the drum supporting hubs 23 and 24, as best shown in Fig. 2.

When the corks 36 reach the extremity of the track 40 they will drop by gravity into an inclined arcuate funnel 46 for guiding them into an inclined tubular chute 47. The tubular chute 47 has its lower end fitted within the upper enlarged extremity 48 of a vertical tubular cork magazine 49 in which the corks are adapted to be stacked. The cork magazine 49 is adapted to pass downwardly through an aperture 50 in the stationary drum 19, and is connected to the chute 47 within the hopper 18.

Before the corks are placed in the hopper 18 they will preferably be softened somewhat by soaking in a water bath (not shown).

To positively discharge the corks 36 from the radial sockets 27 provision is made of a curved resilient wire finger 51 adapted to extend downwardly into the groove 28 at the top of the drum 20. The wire finger 51 is rigidly held in a stationary position on the top of the stationary drum 19 by means of a flat metal bracket 52. From this construction it will be obvious that any corks that have a tendency to stick in their respective sockets 27 due to adhesion, will be positively ejected therefrom by the wire finger 51, and consequently will fall by gravity into the funnel 46.

In the event that the magazine 49 and the tubular chute 47 should become completely filled with corks, or in case a cork should stick in the funnel 46, provision is made of a rotating "knock out" wheel 53 having a coil spring flipper finger 54 extending radially therefrom. The "knock out" wheel is adapted to rotate in a slot 55 cut within the upright bracket 43 and the depending arm 42, and the flipper finger 54 is made sufficiently long to swing through an elongated slot 56 cut in the inner side of the funnel 46.

It will thus be seen that any corks which may become lodged or stuck in the funnel 46 will be immediately discharged by means of the rotating flipper finger 54. With the object of providing power for rotating the flipper wheel 53, provision is made of a U-shaped bracket 57 having horizontal legs 57a and 57b. The lower leg 57a extends within the hopper 18 where it is connected to the upper end of the upright support bracket 43. The lower leg forms a bearing for a shaft 58 to one extremity of which the flipper wheel 53 is secured, and having a small sheave 59 on its outer end. The sheave 59 is connected by means of a crossed belt 60 to an overhead sheave 61 of larger diameter which is carried on the outer extremity of a horizontal shaft 62 journalled in the upper leg 57b of the bracket member 57. Another small sheave 63 is attached to the inner end of the upper shaft 62, and is adapted to receive power from a belt 64 engaging in an annual V-shaped groove 65 formed in the outer periphery of the drum rim 26.

To dislodge any corks which may become tipped in the sockets 27 an elongated arcuate discharge slot 66 is cut in the stationary drum 19 at the junction of the conical portion 21 and the flanged rim 35 thereof.

By means of this construction it will be obvious that any tilted corks as the hopper advances will fall out of the sockets 27 and pass through the slot 66.

For receiving any excess water that may collect in the hopper 18, and which is adapted to drain therefrom either through the clearance between the drum rims 35 and 26 or through the annular groove 28, provision is made of a drip pan 67 supported underneath the hopper 18 by means of a bracket member 68 rigidly attached to the ribbed arm 15 (see Fig. 1). The water in the pan 67 may be drawn off whenever desired through a pet-cock (not shown) attached to the base of said drip pan 67.

*Transfer mechanism*

When the corks 36 enter the magazine 49, they are allowed to drop in an upright position into a horizontal passageway 69, said passageway formed by means of a U-shaped channel rail 70 and a cover plate 71. The corks 36 will be intermittently forced forwardly in the passageway 69 by means of a reciprocating block 72 slidably mounted in a groove 73 formed in the upper surface of the raised platform 14 and in alinement with said passageway 67. The block 72 is held in position by means of an angular plate 74 rigidly secured to the surface of the raised platform 14.

The block 72 is adapted to be reciprocated by means of a manually operated handle lever 75, the inner arm 75a of which is fitted into a transverse slot 76 formed in the underside of said block and pivoted therein by means of a vertical eye pin 77. The lever 75 is fulcrumed on a screw 78 mounted in a lug 79 cast integral with the raised platfrom 14.

The outer arm 75b of the handle member 75 extends forwardly in convenient reach of the operator, and is enclosed in an elongated guide slot 80 formed in the upright leg of a laterally extending angle iron or bracket 81, one end of which is secured to the top surface of the heavy supporting bracket 11 (see Fig. 1), as by cap screws 82. The throw of the handle member 75 may be controlled by means of an adjusting screw 83 engaged in a tapped lug 83a adapted to be locked in any desired adjusted position in the bracket slot 80 by means of a set screw 84.

The forward upper edge of the reciprocating block 72 is rounded at 72a to permit said block to slip under the magazine 49 for pushing the corks forwardly. When the block 49 recedes, the stack of corks 36 in the magazine will drop and bring the bottom cork into alinement with the passageway 69. The sliding block is urged to the rear by means of a helical spring 85, the forward end of which is connected to the depending eye pin 77 while the rear end thereof is detachably secured to the extremity 86 of a bracket member 87 secured to the undersurface of the bed plate 13, as by screws 88.

For the purpose of softening the corks 36 as they travel through the passageway 69, said corks are subjected to the action of steam arising from a water bath 89 heated by an electric immersion heater 90. The water bath 89 is located beneath a perforated section 91 of the bed plate 13.

The water bath 89 is supported on a pair of cross-rods 92 and 93 extending between the upright opposed walls of the base bracket 11 and retained therein by means of end nuts 94. A liquid 95, such as water, is supplied to the bath 89 whenever necessary. Steam is adapted to escape from the cork passageway 69 by means of an elongated slot 96 centrally cut into the cover plate 71.

Located in front of the cork transfer mechanism is a bottle-filling guiding member 97, for filling bottles 98 with any desired liquid, such as a beverage (see Fig. 2). The flow of liquid into the bottle 98 is controlled by a valve collar 99 having a central beveled aperture 100 through which the corks are adapted to be downwardly forced in succession by means of a vertically reciprocating punch 101, and tightly squeezed into the reduced neck 102 of the bottle 98.

In order to successively transfer the corks 36 from the front end of the channel rail 70 into alinement with the punch 101 and beveled aperture 100 of the valve operating collar 99, provision is made of a pair of gripping fingers 103 and 104 having arcuate inner faces 105 and 106 for engaging the peripheries of the corks 36. The gripping fingers 103 and 104 are adapted to reciprocate within a pair of slots 107 and 108 formed in the front of the side walls of the channel rail 70, and said fingers 103 and 104 are adjustably carried on the extremities of a pair of elongated horizontal resilient metal strips 109 and 110 by means of screws 111 and 112 located in slots 113 provided in said strips 109 and 110, as shown in Figs. 5 and 7.

The metal strips 109 and 110 are adapted to slide in grooves 114 and 115 formed longitudinally in the outer side walls of the channel rail 70, and said strips extend rearwardly beyond said rail 70 where they are rigidly attached to the opposite sides of the reciprocating block 72 by means of spacing blocks 116 and screws 117. The strips 110 and 111 are held securely within their respective grooves 114 and 115 by means of a plurality of short vertical strips 118 attached to the opposite sides of the channel rail 70.

As clearly shown in Fig. 7, a pair of converging curved spring clips 119 and 120 are located inside the strips 109 and 110, said clips being adapted to prevent the foremost cork 36a from being forced back into the passageway 69 while the rear inclined faces of the cork feeding fingers 103 and 104 are caused to slip over the cork 36a and grip the same at the end of the rearward stroke of the strips 109 and 110. The rear ends of the spring clips 119 and 120 are suitably secured within recesses provided in the channel rail 70, as by screws 121.

Located below the cork gripping fingers 103 and 104 are a pair of balls 124 and 125, which are adapted to be pressed inwardly by a pair of spring strips 126 and 127 secured in place as by screws 128, said balls being located in sockets formed in the walls of the channel rail 70 (see Fig. 8). The balls 124 and 125 are adapted to extend slightly within the cork passageway 69 and as the corks pass through said passageway 69, each cork in succession will be gripped between the balls 124 and 125 and also the spring clips 119 and 120 located above. Provision is also made of a T-shaped leaf spring 131 attached to the cover plate 71 of the channel rail 70, said spring 131 having a downwardly curved resilient arm 132 at its front end adapted to resiliently engage the tops of said corks.

Operation

In the operation of the machine, the corks 36, which have preferably been previously soaked in water to partially soften them, will first be dropped into the hopper 18 through the opening 38 and chute 39. The continuous rotation of the rear drum 20 will cause the corks 36 to be tumbled around in the bottom of the hopper 18 and fall into the radial sockets 27 at the outer edge of said drum 20. The corks will be carried upwardly by the drum, and after passing over the track 40, they will drop by gravity into the funnel 46, through the chute 47, and into the cork stacking magazine 49. The number of corks stacked in the magazine 49 may be readily determined visibly by means of an elongated slot 132 in the front surface of the magazine 49.

When the magazine has been partly filled with corks, the operator will repeatedly swing the handle member 75 to the left as shown in Fig. 3 for reciprocating the block 72 and transferring the lowermost cork from the magazine forwardly into the passageway 67 of the channel rail 70. When the passageway 67 has been fully charged with corks, as shown in Fig. 2, the operator will then fill up a bottle 101 with the desired liquid by manipulation of the bottle filling machine. The operator will then again swing the handle 75 to the left moving the entire row of corks in the same direction through the steam filled passageway 69, where said corks are softened. The foremost cork in said passageway 69 will then be picked up by the gripping fingers 103 and 104 and carried forward to the dotted line position as shown in Figs. 1 and 2 in direct alinement with the aperture 100 and the cork inserting plunger 101. The plunger 101 will then be moved downwardly, forcing the cork out from the gripping fingers 103 and 104, compressing it in the aperture 100 and pushing it into the neck of the bottle 102.

After the cork has been inserted, the handle member 75 will be released, and while the operator is replacing the filled bottle with an unfilled bottle, said handle member 75 will be swung back to its normal position by the influence of the helical tension spring 85. The gripping fingers 103 and 104 will also recede at this time and will engage another cork, after which the operation will be repeated.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a bottle corking machine, a cork containing hopper comprising a stationary front wall and a rotating rear wall, a vertical cork stacking magazine extending through said stationary wall, a plurality of cork receiving pockets in said rotating wall, means for automatically removing corks from said pockets and disposing them in a vertical position in said cork stacking magazine, and means for successively transferring the corks from said magazine into alinement with a bottle filling machine.

2. In a bottle corking machine, a cork containing hopper comprising a stationary front wall and a rotating rear wall, a tubular cork stacking magazine extending through said stationary wall, an inclined chute on said front wall directing corks into said hopper, said rear wall having pockets in its rim, a stationary arcuate member at the upper part of said rear wall for preventing the corks from falling out of said pockets before delivery to said magazine, a chute located at the end of said arcuate member for directing the corks into said magazine, and means located at the bottom of said magazine for intermittently carrying said corks forwardly into alinement with a bottle filling machine.

3. In a bottle corking machine, a cork containing hopper consisting of a stationary conical shaped drum and a rotating conical shaped drum, a cork stacking magazine extending within said stationary drum, said rotating drum having cork pockets in its outer rim, stationary means in said hopper for preventing said corks from falling out of said pockets, means for positively ejecting said corks from said pockets and disposing them vertically in said cork stacking magazine, and means for intermittently transferring the corks individually from said magazine into alinement with a bottle filling machine.

4. In a bottle corking machine, a cork containing hopper consisting of a stationary conical shaped drum and a rotating conical shaped drum, a cork stacking magazine extending within said stationary drum, said rotating drum having cork pockets in its outer rim, stationary means in said hopper for preventing said corks from falling out of said pockets, means for positively ejecting said corks from said pockets and disposing them vertically in said cork stacking magazine, means for intermittently transferring the corks individually from said magazine into alinement with a bottle filling machine, and means for subjecting said corks to the softening action of steam during their transfer from said magazine to said bottle filling machine.

5. In a bottle corking machine, a cork containing hopper consisting of a stationary conical shaped drum and a rotating conical shaped drum, a cork stacking magazine extending within said stationary drum, said rotating drum having cork pockets in its outer rim, stationary means in said hopper for preventing said corks from falling out of said pockets, a depending spring finger for positively ejecting said corks from said pockets and disposing them vertically in said cork stacking magazine, and means for intermittently transferring the corks individually from said magazine into alinement with a bottle filling machine.

6. In a bottle corking machine, a cork containing hopper comprising a stationary drum and a rotating drum, a cork stacking magazine connected with said stationary drum, said rotating drum having a plurality of cork receiving pockets opening into said hopper, a stationary rail in said hopper for holding said corks from falling out of their respective pockets during the upper part of their travel, means attached to the end of said rail for diverting said corks into said magazine, and means for intermittently transferring the corks individually from said magazine into alinement with a bottling machine.

7. In a blank feeding machine, a hopper comprising a stationary wall having a chute extending therethrough, a rotary wall having a rim containing a plurality of pockets, said pockets opening inwardly to receive said blanks by gravity, a flared mouth piece at the top of said chute to receive said blanks by gravity from the pockets at the top of said hopper, said mouth piece having a slot extending downwardly from near its upper edge, and a spring finger adapted to move intermittently upwardly through said slot to eject any blanks improperly positioned in said mouth piece.

8. In a blank feeding machine, a hopper comprising a stationary wall having a chute extending therethrough, a rotary wall having a rim containing a plurality of pockets, said pockets opening inwardly to receive said blanks by gravity, a mouth piece at the top of said chute to receive said blanks by gravity from the pockets at the top of said hopper, said mouth piece having a slot extending downwardly from near its upper edge, and a spring finger adapted to move intermittently upwardly through said slot to eject any blanks improperly positioned in said mouth piece.

9. In a blank feeding machine, a hopper comprising a stationary wall having a chute extending therethrough, a rotary wall having a rim containing a plurality of pockets, said pockets opening inwardly to receive said blanks by gravity, a flared mouth piece at the top of said chute to receive said blanks by gravity from the pockets at the top of said hopper, said mouth piece having a slot extending downwardly from near its upper edge, and a rotary spring finger adapted to move intermittently upwardly through said slot to eject any blanks improperly positioned in said mouth piece.

WILLIAM B. RUNK.